US008365070B2

(12) United States Patent
Song et al.

(10) Patent No.: US 8,365,070 B2
(45) Date of Patent: Jan. 29, 2013

(54) SPELLING CORRECTION SYSTEM AND METHOD FOR MISSPELLED INPUT

(75) Inventors: Hee Jun Song, Namyangju-si (KR); Young Hee Park, Seoul (KR); Hyun Sik Shim, Yongin-si (KR); Jong Gyu Ham, Seoul (KR); Hark Soo Kim, Chuncheon-si (KR); Joo Ho Lee, Chuncheon-si (KR); Se Hee Lee, Chuncheon-si (KR)

(73) Assignees: Samsung Electronics Co., Ltd., Samsung-ro, Yeongtong-gu, Suwon-si, Gyeonggi-do (KR); Knu-Industry Cooperation Foundation, Chuncheon-Si, Gangwon-Do (KR)

( * ) Notice: Subject to any disclaimer, the term of this patent is extended or adjusted under 35 U.S.C. 154(b) by 949 days.

(21) Appl. No.: 12/419,509

(22) Filed: Apr. 7, 2009

(65) Prior Publication Data
US 2009/0254819 A1 Oct. 8, 2009

(30) Foreign Application Priority Data
Apr. 7, 2008 (KR) .................. 10-2008-0032349

(51) Int. Cl.
*G06F 17/00* (2006.01)
(52) U.S. Cl. ......... 715/257; 715/255; 715/256; 715/259
(58) Field of Classification Search .......... 715/255–257, 715/259
See application file for complete search history.

(56) References Cited

U.S. PATENT DOCUMENTS

| 5,907,839 | A | * | 5/1999 | Roth | 715/236 |
| 7,194,684 | B1 | * | 3/2007 | Shazeer | 715/205 |
| 7,831,911 | B2 | * | 11/2010 | Ramsey | 715/257 |
| 8,176,419 | B2 | * | 5/2012 | Zhu et al. | 715/257 |
| 2006/0004744 | A1 | * | 1/2006 | Nevidomski et al. | 707/4 |
| 2007/0118357 | A1 | * | 5/2007 | Kasravi et al. | 704/10 |
| 2009/0182728 | A1 | * | 7/2009 | Anderson | 707/5 |

OTHER PUBLICATIONS

Carlson et al. "Scaling Up Context-Sensitive Text Correction", 2001, IAAI-01 Proceedings, www.aaai.org, pp. 1-6.*
Linguistics 445/515, Context-Sensitive Spelling Correction for Web Queries, Oct. 17, 2007, pp. 1-2.*

* cited by examiner

*Primary Examiner* — Chau Nguyen
(74) *Attorney, Agent, or Firm* — Cha & Reiter, LLC

(57) ABSTRACT

A spelling correction system and method automatically recognizes and corrects misspelled inputs in an electronic device with relatively lower computing power. In a learning process, a misspelling correction dictionary is constructed on the basis of a corpus of accepted words, and context-sensitive strings are selected from among all the strings registered in the dictionary. Context information about the context-sensitive strings is acquired. In an applying process, at least one target string is selected from among all the strings in a user's input sentence through the dictionary. If the target string is one of the context-sensitive strings, the target string is corrected by use of the context information.

25 Claims, 9 Drawing Sheets

FIG . 2

| INCORRECT STRINGS (PRONUNCIATION) | CORRECT STRINGS (PRONUNCIATION / MEANING) | PARTS OF SPEECH |
|---|---|---|
| ⋮ | ⋮ | ⋮ |
| 가취 (GA-CHWI) | 같이 (GA-CHI / AS; LIKE; TOGETHER) | ADVERB |
| 가츼 (GA-CHUI) | 같이 (GA-CHI / AS; LIKE; TOGETHER) | ADVERB |
| 가튀 (GA-CHUI) | 같이 (GA-CHI / AS; LIKE; TOGETHER) | ADVERB |
| 가티 (GA-CHUI) | 같이 (GA-CHI / AS; LIKE; TOGETHER) | ADVERB |
| 강추 (GANG-CHU) | 강력추천 (GANG-NYEOK-CHU-CHEON / STRONG RECOMMENDATION) | NOUN |
| 강퇴 (GANG-TOE) | 강제퇴장 (GANG-JE-TOE-JANG / FORCED LEAVING) | NOUN |
| 갠 (GAEN) | 개인 (GAE-IN / INDIVIDUAL) | NOUN |
| 갠적 (GAEN-JEOK) | 개인적 (GAE-IN-JEOK / INDIVIDUAL) | DETERMINER |
| 남친 (NAM-CHIN) | 남자친구 (NAM-JA-CHIN-GU / BOY FRIEND) | NOUN |
| 시로 (SI-RO) | 싫어 (SI-REO / DISLIKABLE) | ADJECTIVE |
| 즐 (JEUL) | 그만 (GEU-MAN / NO MORE; STOP) | ADJECTIVE |
| 즐 (JEUL) | 즐겨 (JEUL-GYEO / ENJOY) | VERB |
| ⋮ | ⋮ | ⋮ |

FIG. 3

| CATEGORY | DESCRIPTION |
|---|---|
| ENGLISH | SMALL LETTERS AND CAPITAL LETTERS OF ALPHABET |
| NUMBER | NUMBERS FROM 0 TO 9 |
| SPECIAL CHARACTER | SPECIAL CHARACTERS SUCH AS @, #, $, % |
| AUXILIARY INFLECTIONAL WORD | FORTY THREE AUXILIARY INFLECTIONAL WORDS IN KOREAN LANGUAGE SUCH AS '가' (SOUNDS 'GA' ), '계시' (SOUNDS 'GYE-SI' ), '드리' (SOUNDS 'DEU-RI' ), ETC. |
| SUFFIX | TWENTY FIVE SUFFIX IN KOREAN LANGUAGE SUCH AS '댁' (SOUNDS 'DAEK' ), '류' (SOUNDS 'RYU' ), '론' (SOUNDS 'RON' ), ETC. |
| POSTPOSITION | TWO HUNDRED ELEVEN POSTPOSITIONS IN KOREAN LANGUAGE SUCH AS '이' (SOUNDS 'I' ), '가' (SOUNDS 'GA' ), '을' (SOUNDS 'EUL' ), '를' (SOUNDS 'REUL' ), ETC. |
| VERB ENDING | FIVE HUNDRED THIRTY FOUR VERB ENDINGS IN KOREAN LANGUAGE SUCH AS '라고' (SOUNDS 'RAGO' ), '다' (SOUNDS 'DA' ), '까' (SOUNDS 'KKA' ), ETC. |
| OTHERS | THE OTHERS THAN THE ABOVE |

FIG. 4

| LETTER | CLASS | $f(W_{bcforc})$ | $f(w_{-L}W_{a/l}w_{+l})$ | $f(w_{-L}W_{a/l})$ | $f(W_{a/l}w_{+l})$ | $f(c_{-L}W_{a/l}c_{+l})$ | $f(c_{-L}W_{a/l})$ | $f(W_{a/l}c_{+l})$ |
|---|---|---|---|---|---|---|---|---|
| ... | ... | ... | ... | ... | ... | CONTEXT INFORMATION ... | ... | ... |
| 시로 | STRING | 2 | 9시로에 : 1<br>수시로에 : 1 | 9: 1<br>수: 1 | 에: 2 | Number/OTHER:1<br>OTHER/OTHER:1 | NUMBER: 1<br>OTHER: 1 | OTHER: 2 |
| 삼아 | STRING | 2 | 말삼아하 : 1<br>틀삼아하 : 1 | 말: 1<br>틀: 1 | 하: 2 | OTHER/OTHER:1<br>POSTP./OTHER:1 | OTHER: 1<br>POSTPOSITION: 1 | OTHER: 2 |
| 이 | POSTPOSITION | 7 | 망이넘 : 1<br>랑이랑 : 1 | 망: 1<br>랑: 1 | 넘: 1<br>랑: 1 | OTHER/OTHER:<br>2 | OTHER: 2 | OTHER: 2 |
| 가 | POSTPOSITION | 6 | | | | | | ... |
| ... | ... | ... | ... | ... | ... | ... | ... | ... |

FIG . 5

| FINAL CONSONANT EXISTENCE | FINAL CONSONANT NON-EXISTENCE |
|---|---|
| ⋮ | ⋮ |
| 과 (SOUNDS 'GWA' ) | 와 (SOUNDS 'WA' ) |
| 관 (SOUNDS 'GWAN' ) | 완 (SOUNDS 'WAN' ) |
| 에서 (SOUNDS 'E-SEO' ) | 서 (SOUNDS 'SEO' ) |
| 으로 (SOUNDS 'EU-RO' ) | 로 (SOUNDS 'RO' ) |
| 으론 (SOUNDS 'EU-RON' ) | 론 (SOUNDS 'RON' ) |
| 은 (SOUNDS 'EUN' ) | 는 (SOUNDS 'NEUN' ) |
| 을 (SOUNDS 'EUL' ) | 를 (SOUNDS 'REUL' ) |
| 이 (SOUNDS 'I' ) | 가 (SOUNDS 'GA' ) |
| 과의 (SOUNDS 'GWA-UI' ) | 와의 (SOUNDS 'WA-UI' ) |
| ⋮ | ⋮ |

SPELLING CORRECTION SYSTEM AND METHOD FOR MISSPELLED INPUT

CLAIM OF PRIORITY

This application claims priority from an application entitled "SPELLING CORRECTION SYSTEM AND METHOD FOR MISSPELLED INPUT" filed in the Korean Intellectual Property Office on Apr. 7, 2008 and assigned Serial No. 10-2008-0032349, the contents of which are incorporated herein by reference in its entirety.

BACKGROUND OF THE INVENTION

1. Field of the Invention

The present invention relates generally to spelling correction technology. More particularly, the present invention relates to a system and a method for automatically recognizing and correcting misspelled inputs in an electronic device with lower computing power.

2. Description of the Related Art

A mobile device, which includes a broad range of devices and may also be referred to as a portable device, a handheld device, portable communication terminal, etc., is typically a pocket-sized computing device typically having a display screen with touch input and/or a miniature keyboard (often referred to as a keypad). Many different types of mobile devices are being used today as follows: communication devices, mobile computers, handheld game consoles, media recorders, media players/displayers, and personal navigation devices.

Because of space limitations which are based in part on consumer preference, such mobile devices inherently use a smaller sized input unit with a smaller number of keys than a traditional keyboard. Therefore, a mobile device is not user-friendly in that it is typically rather difficult to input letters, and this difficulty is a frequent cause of spelling errors. Such spelling errors can be a source of embarrassment, and in a business setting, can make one think the person sending a message is either careless and/or lacks a basic grasp of the written language.

In an attempt to solve the above-mentioned problem, some approaches have been proposed in the art in which input is automatically corrected. One approach is a word-based correction model. This word-based correction model is a method of searching a pre-established correction dictionary by means of n-gram or edit-distance technique, selecting thereby candidate words for correction, and substituting new words registered in the correction dictionary by using context statistics. The word-based correction model, however, requires a large-sized dictionary capable of containing a great variety of new-coined words and abbreviated words frequently used in colloquial expressions. Thus, one shortcoming of the word-based correction model is the need of an unfavorably a high-capacity memory. Another drawback to this solution is that by trying to reduce memory requirements by having an inventory of stored words often less than a language such as English, for example, there is a tendency for technical terms and idiomatic phrases to be flagged as errors and erroneously "corrected" to a word that is close in spelling to the flagged word.

Another approach is an alphabet-based correction model. This model is a method of dividing words into alphabets, and then deleting or inserting alphabets or substituting new alphabets, based on alphabet conversion statistics obtained from a large-sized learning data. Despite the advantage that an alphabet-based correction model does not require a word dictionary, this model also needs a great memory space for storing a large-sized learning data and statistical information thereof.

For at least some of the above reasons, these conventional above-mentioned approaches may be unavailable for electronic devices with lower computing power (i.e., a low-capacity memory and a poor processing capacity) such as mobile devices.

SUMMARY OF THE INVENTION

Accordingly, the present invention provides a spelling correction system and a related method particularly suitable for electronic devices with lower computing power such as, for example, mobile devices.

According to an exemplary aspect of the present invention, a spelling correction method comprises a learning process which includes constructing a misspelling correction dictionary on the basis of a corpus of accepted words, selecting context-sensitive strings, which have different meanings according to context, from among all the strings registered in the misspelling correction dictionary, and acquiring context information about the context-sensitive strings; and an applying process which includes receiving a user's input sentence, selecting at least one target string from among all the strings in the user's input sentence through the misspelling correction dictionary, and, if the target string is one of the context-sensitive strings, correcting the target string by using the context information.

According to another exemplary aspect of the present invention, a spelling correction system comprises a learning unit which includes a dictionary constructing unit for constructing a misspelling correction dictionary on the basis of a corpus of accepted words, an information extracting unit for selecting context-sensitive strings, which have different meanings according to context, from among all the strings registered in the misspelling correction dictionary, and for acquiring context information about the context-sensitive strings; and an applying unit which includes a string correction unit for receiving a user's input sentence, for selecting at least one target string from among all the strings in the user's input sentence through the misspelling correction dictionary, and, if the target string is one of the context-sensitive strings, for correcting the target string by using the context information.

BRIEF DESCRIPTION OF THE DRAWINGS

FIG. 2 is a view partially illustrating a misspelling correction dictionary in accordance with an exemplary embodiment of the present invention.

FIG. 3 is a view illustrating a category table in accordance with an exemplary embodiment of the present invention.

FIG. 4 is a view illustrating a structure of a context information database in accordance with an exemplary embodiment of the present invention.

FIG. 5 is a view illustrating a postposition connection table in accordance with an exemplary embodiment of the present invention.

DETAILED DESCRIPTION

Exemplary, non-limiting embodiments of the present invention will now be described more fully with reference to the accompanying drawings. This invention may, however, as defined by the appended claims, can be embodied in many different forms in addition to the examples discussed herein. Moreover, the present invention should not be construed as limited to the exemplary embodiments set forth herein. Rather, the disclosed exemplary embodiments are provided so that this disclosure will be thorough and complete in understanding so as to fully convey the scope of the invention to those skilled in the art. The principles and features of this invention may be employed in varied and numerous exemplary embodiments without departing from the scope of the invention.

Furthermore, well known or widely used techniques, elements, structures, and processes may not be described or illustrated in detail to avoid obscuring appreciation of the present invention by a person of ordinary skill in the art.

Figure 1:
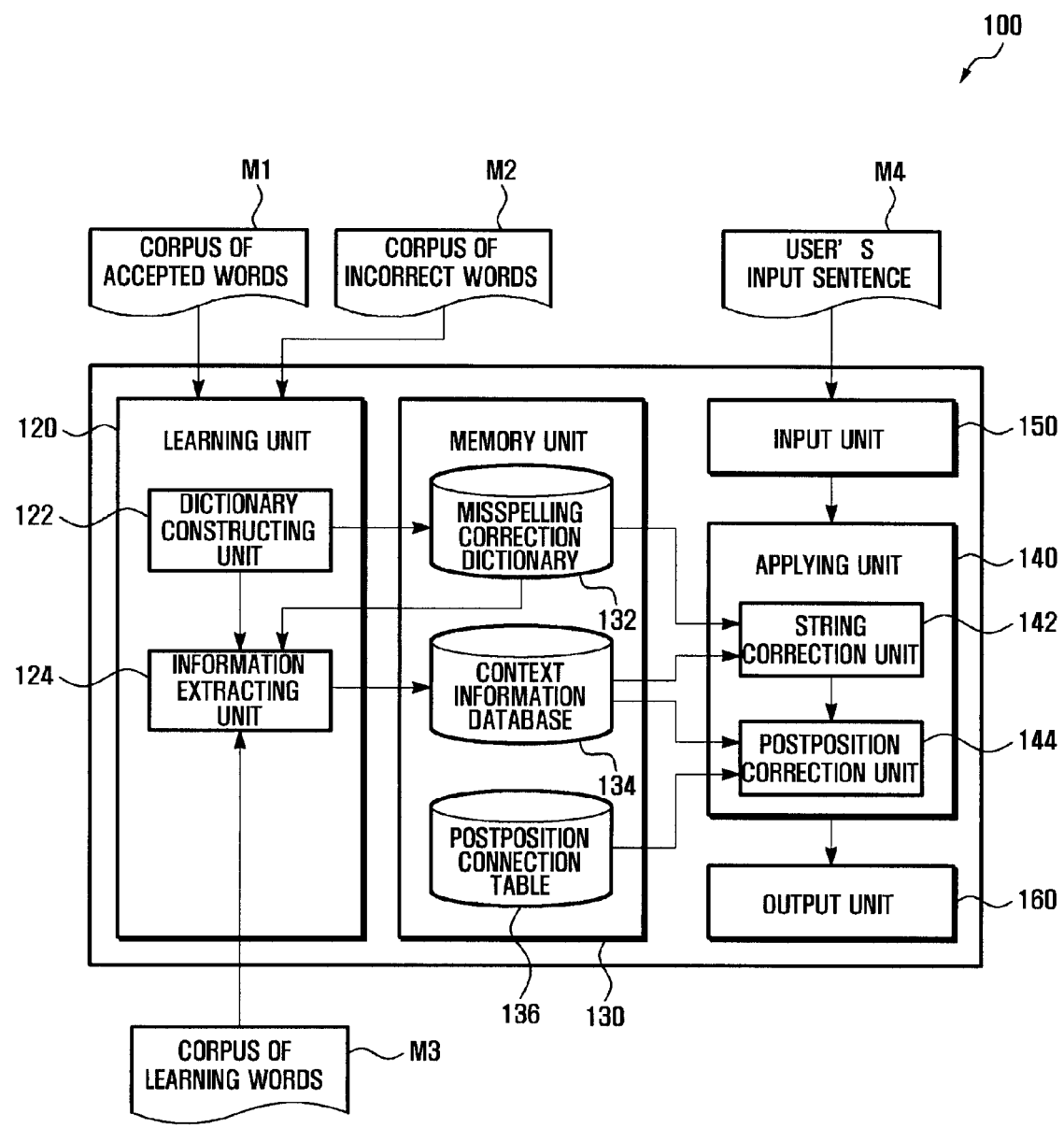
FIG. 1 is a block diagram illustrating a spelling correction system for misspelled inputs in accordance with an exemplary embodiment of the present invention.

FIG. 1 shows, in a block diagram, a spelling correction system 100 for misspelled inputs in accordance with an exemplary embodiment of the present invention.

Referring now to FIG. 1, the spelling correction system 100 for misspelled inputs includes a learning unit 120, a memory unit 130, an applying unit 140, an input unit 150, and an output unit 160. The spelling correction system 100 acquires statistical context information via a learning process executed in the learning unit 120, and stores such context information from the learning process in the memory unit 130. Additionally, this system 100 applies the stored context information to a user's input sentence M4 in the applying unit 140, and thereby corrects misspelled letters of a user's input sentence M4.

Specifically, the learning unit 120 constructs a misspelling correction dictionary 132 in the memory unit 130, selects context-sensitive strings (that is, having different meanings according to context) from among all the strings registered in the misspelling correction dictionary 132, and acquires statistical context information of the context-sensitive strings.

To execute the above functions, the learning unit 120 preferably includes a dictionary constructing unit 122 and an information extracting unit 124.

The dictionary constructing unit 122 creates the misspelling correction dictionary 132 on the basis of a corpus of accepted words M1 and a corpus of incorrect words M2. Here, a corpus of accepted words M1 mean a collection of correctly spelled words found in existing lexicons, vocabularies, dictionaries, etc. A corpus of incorrect words M2 not only mean misspelled strings caused by a mistaken input, but also includes newly coined words (such as slang words) used in, for example, Internet or mobile devices (such as abbreviated phrases used in sending text messages e.g. "texting") by young people. These incorrect words M2 may be gained from web sites in Internet, for example. In order to construct the misspelling correction dictionary 132, the dictionary constructing unit 122 acquires a corpus of accepted words M1 and a corpus of incorrect words M2, and then classifies the acquired words into correct strings and incorrect strings through a user's choice, for example.

The misspelling correction dictionary 132 comprises a database for providing correct strings against incorrect strings, and is stored in the memory unit 130. The misspelling correction dictionary 132 is preferably composed of three fields, namely, an incorrect string field, a correct string field, and a part-of-speech field.

FIG. 2 is a view partially illustrating the misspelling correction dictionary 132 in accordance with an exemplary embodiment of the present invention. FIG. 2 shows the English pronunciation for a number of a number of Korean words comprising adverbs, nouns, adjectives, etc.

Referring now to FIG. 2, the leftmost column comprises an incorrect string field that is used to record misspelled strings caused by a user's incorrect input (e.g., '가춰', '가칙', '가뤼', '가티') and new-coined words currently used by young people (e.g., '강추', '강퇴', '갠', '갠적', '남친', '시로', '즐').

The center column in FIG. 2 comprises a correct string field, which is used to record correctly spelled strings from which spelling errors of incorrect strings are removed. For example, a correct string '같이' is registered in connection with incorrect strings '가춰', '가칙', '가뤼', and '가티'. Also, correct strings '그만' and '즐겨' are registered in connection with an incorrect string '즐'.

The part-of-speech field is used to record parts of speech in connection with respective incorrect strings or correct strings.

Returning to FIG. 1, the dictionary constructing unit 122 in this exemplary embodiment converts the misspelling correction dictionary 132 into the TRIE structure after construction. This TRIE structure may minimize the memory volume of the dictionary 132 and may also shorten a search time. A detailed description regarding this structure will be discussed, infra.

With reference to FIG. 1, the information extracting unit 124 selects incorrect strings by turns, (for example, the context-sensitive strings are selected by comparing a misspelling correction dictionary with a corpus of learning words M3 in the misspelling correction dictionary 132) and compares the selected strings with a corpus of learning words M3). Here, a corpus of learning words M3 comprises a large collection of words commonly used and correctly spelled. That is, a corpus of learning words M3 is used to determine whether the selected string is used in general.

If the selected incorrect string is found once or more in a corpus of learning words M3, the information extracting unit 124 assigns that string to a context-sensitive string. In other words, if any incorrect string is used in general, that string has a strong possibility of being used in different meanings according to the context of surrounding words, and thus becomes a context-sensitive string. For example, if an incorrect string '시로' is found in a corpus of learning words M3, a string '시로' is assigned to a context-sensitive string that may have two or more meanings depending on context. On the other hand, the frequency as criteria for determining whether the selected incorrect string comprises a context-sensitive string may not be limited to once, and may vary according to parts of speech.

After the assignment of the context-sensitive strings, the information extracting unit 124 acquires statistical context information about the context-sensitive strings from a corpus of learning words M3. At this time, the information extracting unit 124 also acquires the statistical context information about the correct strings corresponding to the context-sensitive strings. For example, when an incorrect string '시로' is a context-sensitive string, the information extracting unit 124 extracts statistical context information about a correct string '싫어' as well as about an incorrect string '시로'.

In this exemplary embodiment, statistical context information is acquired as the number of times (namely, frequency) a target string is found in a corpus of learning words. More specifically, statistical context information used in this exemplary embodiment includes the following: a frequency $f(W_{before})$ a string $W_{before}$ is found, a frequency $f(w_{-1}, W_{all}, w_{+1})$ a string $w_{-1}W_{all}w_{+1}$ is found, a frequency $f(w_{-1}, W_{all})$ a string $w_{-1}W_{all}$ is found, a frequency $f(W_{all}, w_{+1})$ a string $W_{all}w_{+1}$ is found, a frequency $f(c_{-1}, W_{all}, c_{+1})$ a string $W_{all}$ is found between categories $c_{-1}$ and $c_{+1}$, a frequency $f(c_{-1}, W_{all})$ a string $W_{all}$ is found after a category $c_{-1}$, a frequency $f(W_{all}, c_{+1})$ a string $W_{all}$ is found before a category $c_{+1}$.

In the above list, a string $W_{before}$ means a specified target string whose context information will be acquired. A string $W_{all}$ includes a target string $W_{before}$ before corrected and a string $W_{after}$ after corrected. Although in most cases a string $W_{before}$ and a string $W_{after}$ mean respectively an incorrect string and a corresponding correct string, a string $W_{before}$ may be identical with a string $W_{after}$ when a correct string itself is a target string. Additionally, an incorrect string $W_{before}$ (e.g., '즐') may correspond to several correct strings $W_{after}$ (e.g., '그만' and '즐겨'), and vice versa.

A character $w_{-1}$ refers to a syllable located just before a string $W_{all}$. Similarly, a character $w_{+1}$ refers to a syllable located just after a string $W_{all}$.

Furthermore, a character $c_{-1}$ refers to a category to which a string preceding a string $W_{all}$ belongs. Similarly, a character $c_{+1}$ refers to a category to which a string following a string $W_{all}$ belongs. Here, a category is applied to a preceding string (namely, $c_{-1}$) or a following string (namely, $c_{+1}$), not to a target string. For example, if an incorrect string '시로' in a sentence '9시로 하자' (This Korean language sentence roughly translates to 'Let's set the time for 9 o'clock' and sounds 'ahop-siro haja') is a target string, a character $c_{-1}$ indicates a category of a preceding string '9' and a character $c_{+1}$ does that of a following string '하자'.

FIG. 3 is a view illustrating a category table in accordance with another exemplary embodiment of the present invention.

As shown in FIG. 3, categories in this exemplary embodiment may include other kind of language (e.g., English), a number, a special character, an auxiliary inflectional word (in Korean language grammar), a suffix, a postposition (i.e., a postpositional word functioning as an auxiliary to a main word in Korean language grammar), a verb ending (in Korean language grammar), and the others. These categories may be set forth herein for purposes of illustration and should not be construed as limitation. Such categories may vary with the language or the necessity. The category table may be embedded, for example, in the dictionary constructing unit 122 or stored in the memory unit 132.

Returning to FIG. 1, statistical context information created by the information extracting unit 124 is preferably stored in a context information database 134 of the memory unit 130. As discussed later, statistical context information in the context information database 134 is offered to the applying unit 140.

Statistical context information and its extracting method will also be described in detail later. It is to be understood that the present invention is not limited to the aforesaid statistical context information, and may also employ any other equivalent context information.

The applying unit 140 receives a user's input sentence M4 and, if this sentence contains one or more context-sensitive strings, calculates the context scores of the context-sensitive strings. Additionally, the applying unit 140 corrects a user's input sentence M4, being based on the context scores, and further corrects the postpositions from the corrected sentence.

To execute the above functions, the applying unit 140 preferably includes a string correction unit 142 and a postposition correction unit 144.

The string correction unit 142 determines whether the context-sensitive strings are found in a user's input sentence M4. If yes, the string correction unit 142 calculates the context scores of the context-sensitive strings by using statistical context information thereof. By being based on probability values by statistics of context, the calculation of context scores can be easily made even with lower (relatively low) computing power.

Additionally, based on the calculated context scores, the string correction unit 142 operates to correct a user's input sentence M4. This process of calculating context scores will be described in more detail infra.

The postposition correction unit 144 determines whether or not the string corrected in the string correction unit 142 comprises a substantive (i.e., an indeclinable) part of speech in Korean language grammar. If yes, the postposition correction unit 144 checks a final consonant in the last syllable of the corrected string and, depending on that final consonant, selectively corrects a postposition of the corrected string. This process of correcting a postposition is based on postposition-related context information, and will be described hereinafter in more detail.

Still referring to FIG. 1, the memory unit 130 may be comprised of, for example, a program region and a data region. A program region stores application programs necessary for controlling the operation of the spelling correction system 100, and also stores an operating system (OS). A data region stores data created while such programs are being executed. Particularly, a data region stores the misspelling correction dictionary 132, the context information database 134, and the postposition connection table 136.

The context information database 134 has string-related context information and postposition-related context information. Such context information is created in the information extracting unit 124 and stored in the context information database 134. Particularly, string-related context information is stored together with corresponding strings (i.e., incorrect strings and correct strings), and the postposition-related context information is stored together with the corresponding postpositions.

FIG. 4 comprises an illustration of a structure of the context information database in accordance with an exemplary embodiment of the present invention. As shown in FIG. 4, the context information database includes in this example, three fields, namely, a letter field, a class field, and a context information field.

The letter field is used to record incorrect strings (e.g., '시로'), correct strings (e.g., '싫어'), and postpositions (e.g., '이', '가').

The class field is used to indicate whether a record is related to a string or a postposition. The context information field is used to record context information related to a string or a postposition. This context information is acquired from a corpus of learning words M3 and expressed as frequency a string or a postposition is found in a corpus of learning words. As discussed above, $f(W_{before})$, $f(w_{-1}, W_{all}, w_{+1})$, $f(w_{-1}, W_{all})$, and $f(W_{all}, w_{+1})$ in the context information field refer to the respective frequencies of a string $W_{before}$, a string $w_{-1}W_{all}w_{+1}$, a string $w_{-1}W_{all}$, and a string $W_{all}w_{+1}$ is found in a corpus of learning words. Also, $f(c_{-1},W_{all},c_{+1})$, $f(c_{-1},W_{all})$, and $f(W_{all},c_{+1})$ refer to the respective frequencies that a string $W_{all}$ is found between categories $c_{-1}$ and $c_{+1}$, after a category $c_{-1}$, and before a category $c_{+1}$, respectively. This context information will be described in detail later.

Referring now to FIG. 1, the postposition connection table 136 contains information related to postpositions and offers such information to the postposition correction unit 144.

FIG. 5 comprises a view illustrating the postposition connection table 136 in accordance with an exemplary embodiment of the present invention. As shown in FIG. 5, the postposition connection table 136 is comprised of two fields, namely, a final-consonant existence field and a final-consonant non-existence field. The final-consonant existence field is used to record postpositions each of which is added to a syllable with a final consonant. The final-consonant non-existence field is used to record postpositions, each of which is added to a syllable without a final consonant.

Referring again to FIG. 1, the input unit 150 includes a number of alphanumeric keys and function keys arranged for efficient data entry into the system 100. On receipt of a user's key selection, the input unit 150 creates a key selection signal and sends it to the applying unit 140. For example, the input unit 150 receives a user's input sentence M4 and conveys it to the string correction unit 142 in the applying unit 140. The input unit 150 may employ, for example, a keypad, a touchpad, a wheel key, a touch screen and/or any other type of pointing devices or input devices.

The output unit 160 outputs both visual and audible information. For example, the output unit 160 receives a corrected user's input sentence M4 from the postposition correction unit 144 and outputs it in a visible or audible form. The output unit 160 may employ a well-known display device, for example, a liquid crystal display (LCD) and a speaker.

Hereinbefore, the spelling correction system 100 for misspelled inputs according to an exemplary embodiment of the present invention has been described. This system 100 may be available for relatively smaller computing devices, such as, for example, mobile devices, with lower computing power.

Hereinafter, a spelling correction method for misspelled inputs according to an exemplary embodiment of the present invention will now be described. From the following descriptions, the above-discussed system 100 will be better understood by the artisan.

The spelling correction method of the present invention may be logically classified, for example, into a learning process and an applying process. The learning process may include constructing the misspelling correction dictionary 132, selecting context-sensitive strings from among incorrect strings registered in the misspelling correction dictionary 132, and acquiring context information of the context-sensitive strings. The applying process may include calculating context scores based on the context information, and correcting a user's input sentence M4 by using the context scores.

First, the learning process will be described hereinafter.

Figure 6:
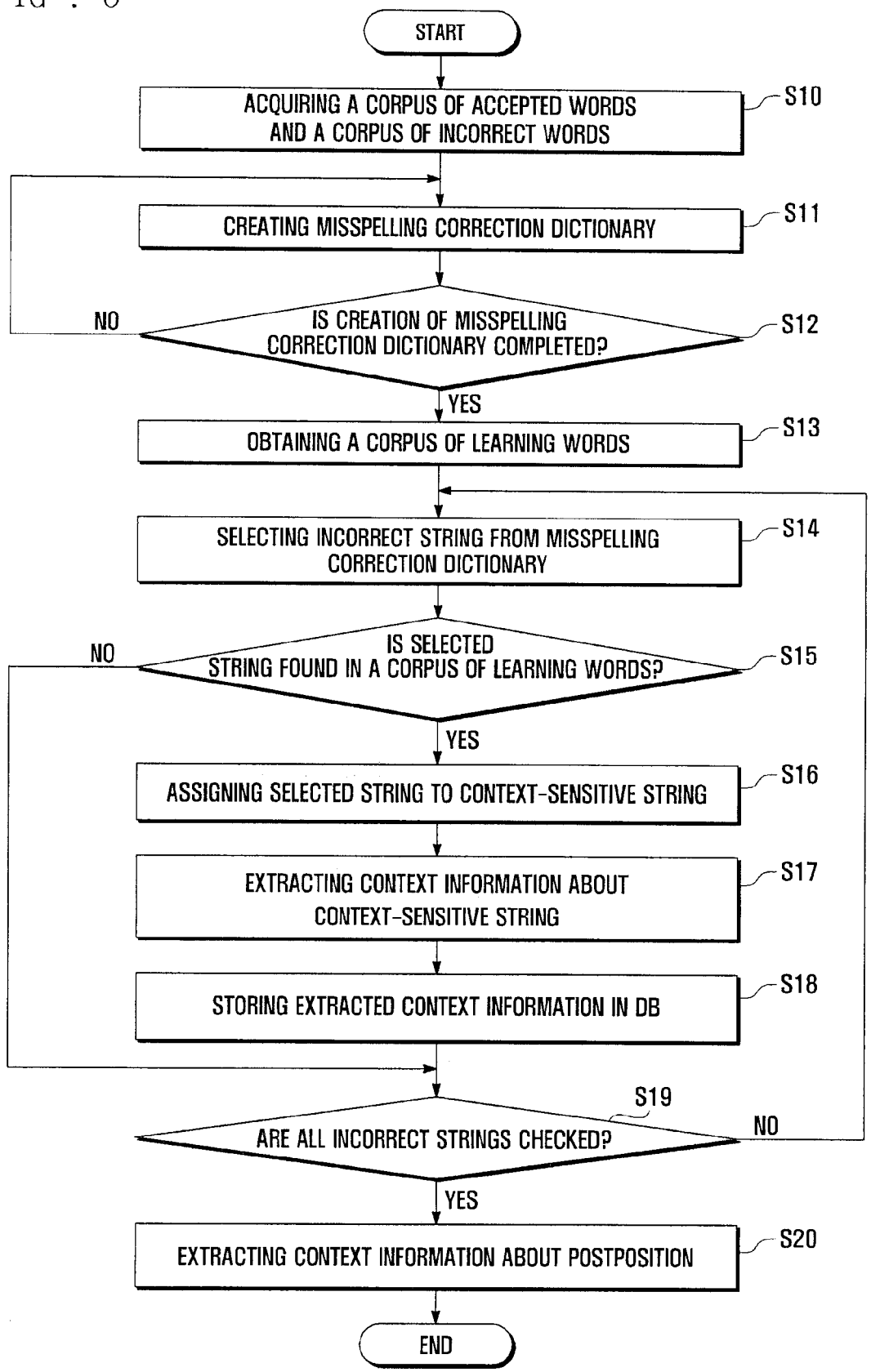
FIG. 6 is a flow diagram illustrating a learning process in a spelling correction method for misspelled inputs in accordance with an exemplary embodiment of the present invention.

FIG. 6 is a flow diagram illustrating a learning process in a spelling correction method in accordance with an exemplary embodiment of the present invention.

Referring to FIGS. 1 and 6, the learning unit 120 acquires a corpus of accepted words M1 and a corpus of incorrect words M2 (S10). This step S10 of acquiring a corpus of words may be executed through access to Internet, or by a user's input.

Next, the dictionary constructing unit 122 of the learning unit 120 creates the misspelling correction dictionary 132 on the basis of a corpus of accepted words M1 and a corpus of incorrect words M2 (S11). In one exemplary embodiment, a user compares incorrect strings in a corpus of incorrect words M2 with correct strings in a corpus of accepted words M1, and thereby forms one by one string sets each of which consists of an incorrect string, a corresponding correct string, and a part of speech. Additionally, based on these string sets, the dictionary constructing unit 122 registers incorrect strings, correct strings, and parts of speech in corresponding fields of the misspelling correction dictionary 132, as shown in FIG. 2.

In another exemplary embodiment, the forming process of the string sets may be automatically performed without a user's intervention or at a minimum of user's effort. For example, through comparison between a corpus of incorrect words M2 and a corpus of accepted words M1 of the same sentence configuration, incorrect strings and corresponding correct strings may be extracted automatically.

Step S11, which constructs the misspelling correction dictionary 132, may be executed for all strings in a corpus of incorrect words. Moreover, the misspelling correction dictionary 132 may be altered whenever a new-coined word appears or an existing word loses its currency. On the other hand, the aforesaid steps S10 and S11 may be repeated to increase the volume of the misspelling correction dictionary 132.

Next, the dictionary constructing unit 122 determines whether the creation of the misspelling correction dictionary 132 is completed (S12), and then uploads this dictionary 132 in the memory unit 130 if completed. Additionally, the dictionary constructing unit 122 converts the misspelling correction dictionary 132 into the TRIE structure (in the form of syllable TRIE or alphabet TRIE) before uploading.

Figure 7:
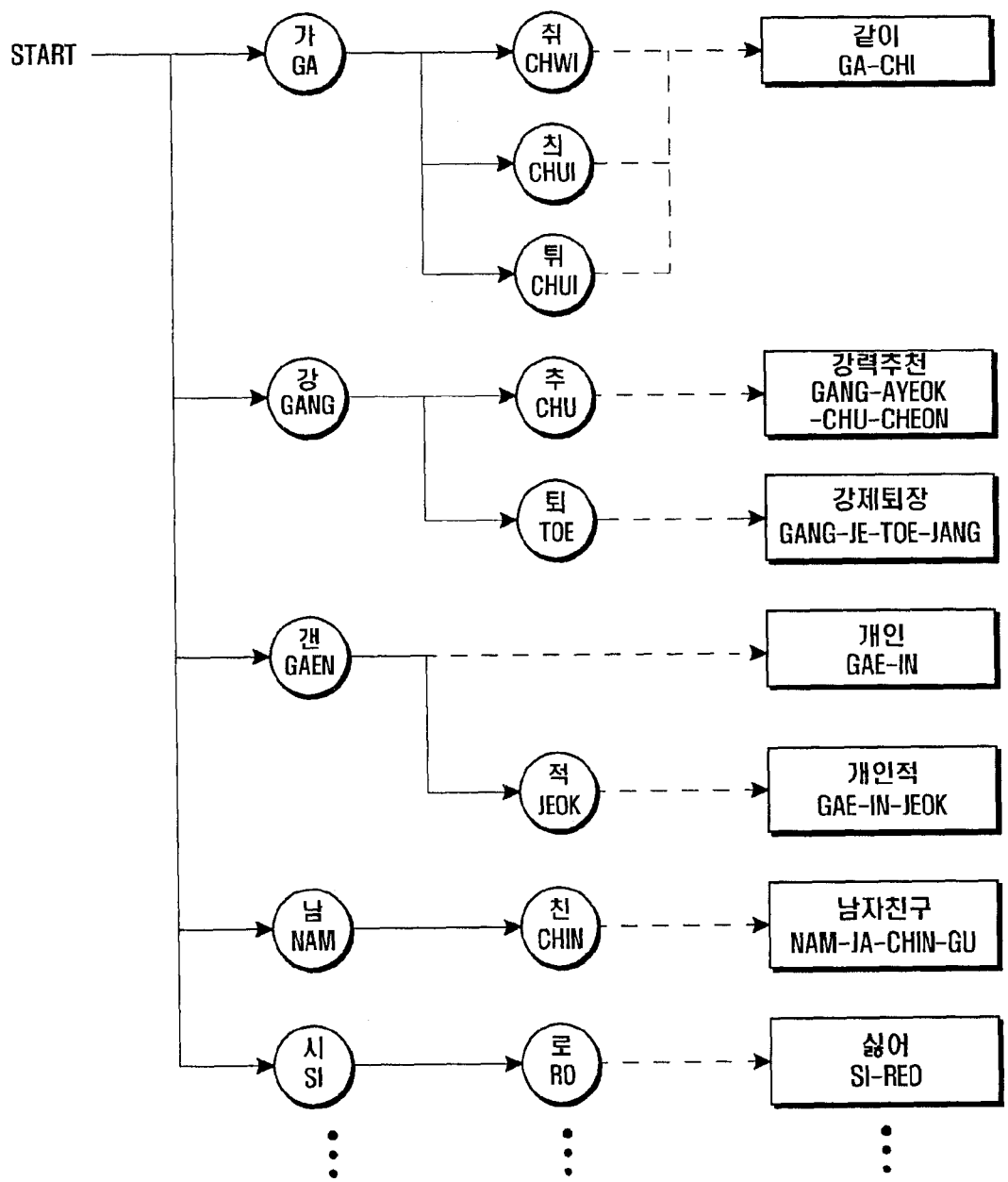
FIG. 7 is a view illustrating a syllable TRIE structure in accordance with an exemplary embodiment of the present invention.

FIG. 7 is a view illustrating a syllable TRIE structure in accordance with an exemplary embodiment of the present invention.

The tree data (TRIE) structure is an ordered tree data structure that is used to store an associative array where the keys are usually strings. In the TRIE structure, all the descendants of a node have a common prefix of the string associated with that node. Therefore, the TRIE structure has an advantage that it is easy to use a longest-prefix matching search or a prefix-only matching search. FIG. 7 shows a representative TRIE structure regarding a set of incorrect strings {가춰 (GA-CHWI), 가칙 (GA-CHUI), 가뷔 (GA-CHUI), 가터 (GA-CHUI), 강추 (GANG-CHU), 강퇴 (GANG-TOE), 갠 (GAEN), 갠적 (GAEN-JEOK), 남친 (NAM-CHIN), 시로} (SI-RO) contained in the misspelling correction dictionary 132 shown in FIG. 3.

The conversion of the misspelling correction dictionary 132 into the TRIE structure may favorably reduce the memory volume allotted to a duplicate syllable or alphabet in comparison with other typical structures such as the Hash structure or the B-tree structure, thus allowing the efficient use of the memory unit 130. Furthermore, since a search time is proportional to the length of a string, the conversion into the TRIE structure may allow a quick search. The TRIE structure is, however, exemplary only and not to be considered as a limitation of the present invention. Other structures which allow the efficient use of memory and a quick search may be alternatively employed for the present invention.

Additionally, a spelling correction using the above-discussed misspelling correction dictionary 132 only may cause unexpected another error. The following is an example of such an error.

Let's suppose a user inputs a Korean language sentence '약속 9시로 하자' (This sentence means 'Let's set the appointed time for 9 o'clock' and sounds 'yak-sok siganeun ahop-siro haja'). Here, if an incorrect string '시로' (corresponding to a correct string '싫어') is registered in the misspelling correction dictionary 132 as shown in FIG. 2, a user's input sentence is changed to a sentence '약속 시간은 9싫어' (This sentence has ambiguous meanings such as 'Let's dislike 9 the appointed time' and sounds 'yak-sok siganeun ahop-sireo haja'). That is, a mistaken result is induced instead of a correction.

Accordingly, not only does the learning process of the invention construct the misspelling correction dictionary 132, but also obtains the context information of incorrect strings, being based on a corpus of learning words M3. The following is a detailed description about the latter.

Returning now to FIGS. 1 and 6, the information extracting unit 124 of the learning unit 120 obtains a corpus of learning words M3 (S13). Here, a corpus of learning words M3 means a large collection of words commonly used and correctly spelled. Such a corpus of learning words M3 may be inputted by a user, downloaded from Internet, or gained through any suitable manners.

Next, the information extracting unit 124 selects an incorrect string from the misspelling correction dictionary 132 (S14). For example, the information extracting unit 124 selects an incorrect string '시로' contained in the incorrect string field.

After selection, the information extracting unit 124 determines whether or not the selected string is found in a corpus of learning words M3 (S15). Specifically, the information extracting unit 124 searches the whole corpus of learning words M3 for the same string as the selected. If the selected string appears once or more in a corpus of learning words M3, the information extracting unit 124 assigns the selected string to a context-sensitive string (S16). However, if the selected string is not found in a corpus of learning words M3, that string is not assigned to a context-sensitive string.

Next, the information extracting unit 124 extracts context information about the context-sensitive string (S17). Here, the information extracting unit 124 further extracts context information about a correct string corresponding to the context-sensitive string. In an example of FIG. 2, an incorrect string '시로 (SI-RO)' corresponds to a correct string '싫어' (SI-REO, meaning dislikable). Therefore, the information extracting unit 124 obtains context information about a correct string '싫어' (SI-REO) as well as about an incorrect string '시로' (SI-RO). Similarly, in case of an incorrect string '즐' (JEUL), the information extracting unit 124 obtains context information about corresponding correct strings '그만' (GEU_MAN, meaning "no more" or "stop") and '즐겨' (JEUL-GYEO, meaning "enjoy"), as well as about an incorrect string '즐' (JEUL).

Hereinafter, a step of extracting context information is explained in detail.

First, the information extracting unit 124 extracts sentences containing a context-sensitive string or a corresponding correct string from a corpus of learning words M3, and then removes spaces between words from the extracted sentences.

Next, the information extracting unit 124 obtains context information from the space-removed sentences. As discussed above, context information is as follows: $f(W_{before})$, $f(w_{-1}, W_{all}, w_{+1})$, $f(w_{-1}, W_{all})$, $f(W_{all}, w_{+1})$, $f(c_{-1}, W_{all}, c_{+1})$, $f(c_{-1}, W_{all})$, and $f(W_{all}, c_{+1})$.

If a context-sensitive string is '시로' (SI-RO) for example, the information extracting unit 124 obtains one set of sentences containing '시로' (SI-RO) and other set of sentences containing '싫어' (SI-REO, meaning dislikable) from a corpus of learning words M3. Let's suppose '9시로 예정되었다' (which means 'It was scheduled for 9' and sounds 'ahop-siro yeojeong-doe-oetta') and '수시로 예산을 변경해' (which means 'frequently change a budget' and sounds 'susiro yesaneul byeon-gyeong-hyae') are obtained as sentences containing '시로'. In addition, let's suppose '정말 싫어하다' (which means 'have a strong dislike' and sounds 'jeong-mal sireohada') and '너를 싫어하지 않아' (which means 'don't dislike you' and sounds 'neoreul sireohaji ana') are obtained as sentences containing '싫어'.

In the case identified in the preceding paragraph, the information extracting unit 124 obtains context information as shown in FIG. 4. Referring to FIG. 4, context information about '시로' (SI-RO) is as follows. A string '시로' (SI-RO) is found twice in sentences, so a frequency $f(W_{before})$ is twice. Similarly, a frequency $f(w_{-1}, W_{all}, w_{+1})$ is once in '9 시로예' and once in '수시로예'. A frequency $f(w_{-1}, W_{all})$ is once in '9 시로' and once in '수시로'. A frequency $f(W_{all}, w_{+1})$ is twice in '시로예'. A frequency $f(c_{-1}, W_{all}, c_{+1})$ is once in number/other and once in other/other. A frequency $f(c_{-1}, W_{all})$ is once in number and once in other, and a frequency $f(W_{all}, c_{+})$ is twice in other.

Returning now to FIGS. 1 and 6, the information extracting unit 124 stores the extracted context information in the context information database 134 (S18). FIG. 4 shows an example of the context information database 134.

Next, the information extracting unit 124 determines whether all the incorrect strings in the misspelling correction dictionary 132 pass through the aforesaid determination step S15 (S19). If there is a string without passing through step S15, the information extracting unit 124 returns to the previous step S14 and executes steps S14 to S19 again. In other words, step S19 means that it is needed to ascertain whether each of incorrect strings in the misspelling correction dictionary 132 is found in a corpus of learning words M3.

If it is determined in step S19 that there is no string requiring step S15, the information extracting unit 124 extracts context information about postposition from a corpus of learning words M3 and stores it (S20). This step S20 does not necessarily have to follow the extraction of context information about strings. This step S20 may be executed before or simultaneously with the aforesaid S14.

In step S20, the information extracting unit 124 extracts context information about all the postpositions registered in the postposition connection table 136 as shown in FIG. 5. Here, context information about postpositions may be extracted according to the same way as context information about strings. The extracted context information about postpositions is stored in the context information database 134.

Heretofore, the learning process in the spelling correction method according to the present invention is described. To construct the misspelling correction dictionary 132 containing much more strings and to obtain much more context-sensitive strings and their context information, this learning process may be executed repeatedly.

Next, the applying process in the spelling correction method of the invention will be described hereinafter.

Figure 8:
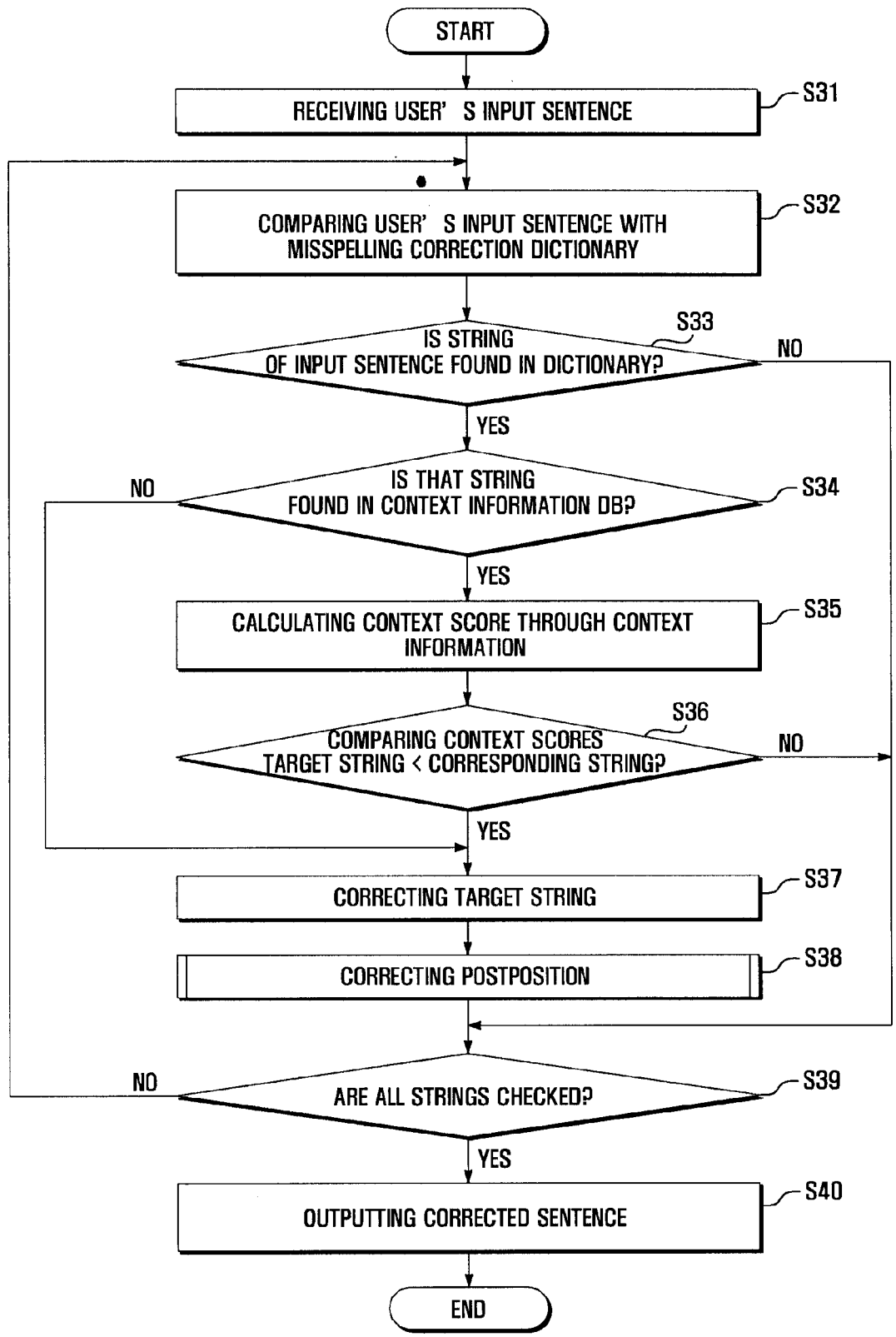
FIG. 8 is a flow diagram illustrating an applying process in a spelling correction method for misspelled inputs in accordance with yet another exemplary embodiment of the present invention.

FIG. 8 is a flow diagram illustrating exemplary operation of an applying process in a spelling correction method for misspelled inputs in accordance with an exemplary embodiment of the present invention.

Referring now to FIGS. 1 and 8, the input unit 150 receives a user's input sentence M4 (S31), for example, '남친과의 약속 내일 9시로 변경 햇편 으로 연락 요망' (which means 'A date with a boy friend is changed to tomorrow 9 o'clock and please cellular call' and sounds 'nam-chin-gwaui yak-sok naeil ahop-siro byeon-gyeong han-peoneuro yeol-nak-baram'). Such a user's input sentence M4 is transmitted to the string correction unit 142 of the applying unit 140.

Subsequently, with continued reference to FIGS. 1 and 8, the string correction unit 142 compares a user's input sentence M4 with the misspelling correction dictionary 132 (S32). That is, the string correction unit 142 compares a string of a user's input sentence M4 with all the incorrect strings contained in the misspelling correction dictionary 132. Through comparison, the string correction unit 142 determines whether a string of a user's input sentence M4 is found in incorrect strings in the misspelling correction dictionary 132 (S33). In the above example of a user's input sentence, '남친과의 약속 내일 9시로 변경 핸편 으로 연락 요망', three strings '남친', '시로' and '핸편' (which means a new-coined word of 'cellular phone' and sounds 'han-peon') are found in the misspelling correction dictionary 132.

If a string of a user's input sentence M4 is found in the misspelling correction dictionary 132, the string correction unit 142 further determines whether that string is found as a context-sensitive string in the context information database 134 (S34). Even if any string is registered as an incorrect string in the misspelling correction dictionary 132, that string may not be found in the context information database 134. In the aforesaid example, while a string '시로' (SI-RO) exists in the context information database 134, other strings '남친' (NAM-CHIN) and '핸편' (HAN-PEON) do not exist in that database 134. The former means it is not yet certain that a string '시로' (SI-RO) is an incorrect string. The latter, however, means it is certain that strings '남친' (NAM-CHIN) and '핸편' (HAN-PEON) are incorrect strings.

If any string of a user's input sentence M4 is found in the misspelling correction dictionary 132 in step S33 but not found in the context information database 134 in step S34, the string correction unit 142 goes to step S37 and replaces that string with a correct string registered in the misspelling correction dictionary 132. For example, an incorrect string '남친' (NAM-CHIN) is replaced with a correct string '남자친구' (NAM-JA_CHIN GU "boyfriend") in step S37. Then, a postposition of the corrected string is selectively corrected (S38). This step S38 will be described in detail later.

After one incorrect string (e.g., '남친') and postposition thereof are corrected, it is determined whether to completely check all strings of a user's input sentence M4 (S39). If there remains a string not yet checked, the applying unit 140 returns to the aforesaid step S32 to check that string. For example, through such a repeated process, another incorrect string '핸편' is replaced with a correct string '핸드폰' (which means 'cellular phone' and sounds 'han-deu-pon').

On the other hand, if any string (e.g., '시로') is found as a context-sensitive string in the context information database 134 in the aforesaid step S34, the string correction unit 142 goes to step S35. In this step S35, the string correction unit 142 calculates context scores related to that context-sensitive string by using the context information database 134. Here, the string correction unit 142 calculates the context score of a target string (e.g., '시로') which is found in incorrect strings and also found in context-sensitive strings, and further calculates the context score of a corresponding string (e.g., '싫어') which is registered as a correct string in connection with a target string. If any target string (e.g., '줄') corresponds to two or more correct strings (e.g., '그만' and '즐겨') as discussed above, the context score is calculated with regard to all the corresponding correct strings.

Context scores are obtained from calculation of probability values on the basis of statistical context information. This will be described in detail hereinafter.

In addition, the probability that a target string $W_{before}$ is found in a user's input sentence S can be approximately calculated through the following Equation 1.

$$P(W_{before}|S) \approx P(W_{before}|w_{-1}, W_{all}, w_{+1})$$ [Equation 1]

As discussed above, characters $w_{-1}$ and $w_{+1}$ respectively mean a syllable located just before a string $W_{all}$ and a syllable located just after a string $W_{all}$. Additionally, a string $W_{all}$ includes a target string $W_{before}$ before corrected and a corresponding string $W_{after}$ after corrected. Accordingly, Equation 1 means the probability that front and rear syllables $w_{-1}$ and $w_{+1}$ around a string $W_{before}$ or $W_{after}$ are found with a string $W_{before}$. In other words, Equation 1 represents the probability that a string $W_{before}$ maintains without correction in a current context.

If the entire sentence is considered for the context of a target string $W_{before}$, it is impossible to calculate the probability due to a data scarcity issue. That is the reason for approximating $P(W_{before}|S)$ in Equation 1. Despite an approximation of $P(W_{before}|S)$ by means of Equation 1, a data scarcity issue still remains a little. To solve this problem, the present invention approximates Equation 1 to Equation 2.

$$P(W_{before}|w_{-1}, W_{all}, w_{+1}) \approx$$ [Equation 2]
$$\alpha \frac{f(W_{before})}{f(w_{-1}, W_{all}, w_{+1})} + \beta \frac{f(W_{before})}{f(w_{-1}, W_{all}) + f(W_{all}, w_{+1})} +$$
$$\gamma \frac{f(W_{before})}{f(c_{-1}, W_{all}, c_{+1})} + \delta \frac{f(W_{before})}{f(c_{-1}, W_{all}) + f(W_{all}, c_{+1})}$$

In Equation 2, $f(W_{before})$, $f(w_{-1},W_{all},w_{+1})$, $f(w_{-1},W_{all})$, $f(W_{all},w_{+1})$, $f(c_{-1},W_{all},c_{+1})$, $f(c_{-1},W_{all})$ and $f(W_{all},c_{+1})$ are context information as discussed above. Additionally, $\alpha$, $\beta$, $\gamma$ and $\delta$ are weight parameters which sum up 1.0. These weight parameters are determined in general through experiments in the order of $\alpha > \beta > \gamma > \delta$. In one embodiment of the invention, $\alpha$, $\beta$, $\gamma$ and $\delta$ are 0.5, 0.3, 0.15 and 0.05, respectively. These values of weight parameters are, however, exemplary only and not to be considered as a limitation of the present invention.

For example, let's suppose a user's input sentence M4 is '남친과의 약속 내일 9시로 변경 핸편 으로 연락 요망' (A date with a boy friend is changed to tomorrow 9 o'clock and please cellular call.) as described above. If a target string $W_{before}$ is '시로', a syllable $w_{-1}$ located just before a target string is '9', and a syllable $w_{+1}$ located just after a target string is '변경'. Referring to FIG. 4, related context information is as follows: $f(W_{before})$ is '2' because a string $W_{before}$ is '시로', $f(w_{-1},W_{all},w_{+1})$ is '0' because a string $w_{-1}W_{all}w_{+1}$ is '9시로변', $f(w_{-1},W_{all})$ is '1' because a string $w_{-1}W_{all}$ is '9시로', $f(W_{all},w_{+1})$ is '0' because a string $W_{all}w_{+1}$ is '시로변', $f(c_{-1},W_{all},c_{+1})$ is '1' because categories $c_{-1}$ and $c_{+1}$ are respectively number and other, $f(c_{-1},W_{all})$ is '1' because a category $c_{-1}$ is number, and $f(W_{all},c_{+1})$ is '2' because a category $c_{+1}$ is other.

Therefore, the context score of a target string '시로' is calculated at '0.93' since $0.5(2/2)+0.3(2/1)+0.15(2/1)+0.05(2/3)=0.93$ according to Equation 2.

Similarly, context information about a string '싫어' which is a correct string corresponding to a target string '시로' is as follows: $f(W_{before})$ is '2' because a string $W_{before}$ is '싫어', $f(w_{-1},W_{all},w_{+1})$ is '0' because a string $w_{-1}W_{all}w_{+1}$ is '9싫어변', $f(w_{-1},W_{all})$ is '0' because a string $w_{-1}W_{all}$ is '9 싫어', $f(W_{all},w_{+1})$ is '0' because a string $W_{all}w_{+1}$ is '싫어 변', $f(c_{-1},W_{all},c_{+1})$ is '0' because categories $c_{-1}$ and $c_{+1}$ are respectively number and other, $f(c_{-1},W_{all})$ is '0' because a category $c_{-1}$ is number, and $f(W_{all},c_{+1})$ is '2' because a category $c_{+1}$ is other.

Therefore, the context score of a string '싫어' is calculated at '0.05' since $0.5(\%)+0.3(\%)+0.15(\%)+0.05(\%)=0.05$ according to Equation 2.

Returning to FIGS. 1 and 8, after context scores of a target string and a corresponding string are obtained as discussed above, the string correction unit 142 compares both context scores with each other (S36). That is, the context score of a target string (e.g., 시로) is compared with that of a corresponding string (e.g., 싫어).

If the context score of a target string is smaller than that of a corresponding string, the string correction unit 142 corrects a target string (S37). That is, a relatively smaller context score of a target string means a target string is an incorrect string. Therefore, the string correction unit 142 replaces a target string (i.e., an incorrect string) with a corresponding string (i.e., a correct string). If a target string corresponds to two or more correct strings, a target string is replaced with the greatest scored string. On the other hand, if the context score of a target string is greater than that of a corresponding string as described above, a target string is considered as a proper string and therefore the string correction unit 142 goes to step S39 without correction.

In an unusual case, the context score of a target string may be equal to that of a corresponding string. Some rules may be predefined for this case. For example, it may be a rule in this case that a target string remains without correction when the scores are equal.

As fully described hereinabove, incorrect strings can be corrected using the misspelling correction dictionary 132 and context scores. However, in case of a substantive (in Korean language grammar), a corrected string may be incompatible with an existing postposition. Therefore, step S38 of a postposition correction follows step S37 of a string correction.

A postposition is directly connected to a substantive string, depending on a final consonant of the last syllable of that string. That is, as shown in FIG. 5 and discussed above, a postposition added to a syllable with a final consonant is different from that added to a syllable without a final consonant. So, when a substantive string is replaced with another string, postposition incompatibility may occur according to the existence or non-existence of a final consonant. For example, let's suppose a sentence '남친과의 약속' (which means 'a date with a boy friend' and sounds 'nam-chin-gwaui yak-sok') is given. In this sentence, if an incorrect string '남친' is replaced with a correct string '남자친구', an existing postposition '과의' becomes not suitable and therefore should be replaced with a suitable postposition '와의'. To solve this problem related to postpositions, the present invention uses the postposition connection table 136 shown in FIG. 5 and the context information database 134 as shown in FIG. 4.

The postposition connection table 136 may be pre-established/pre-loaded/pre-defined by a user, or automatically created by using a corpus. Additionally, the postposition correction unit 144 determines whether to correct a postposition by using context information about postpositions in the context information database 134.

Figure 9:
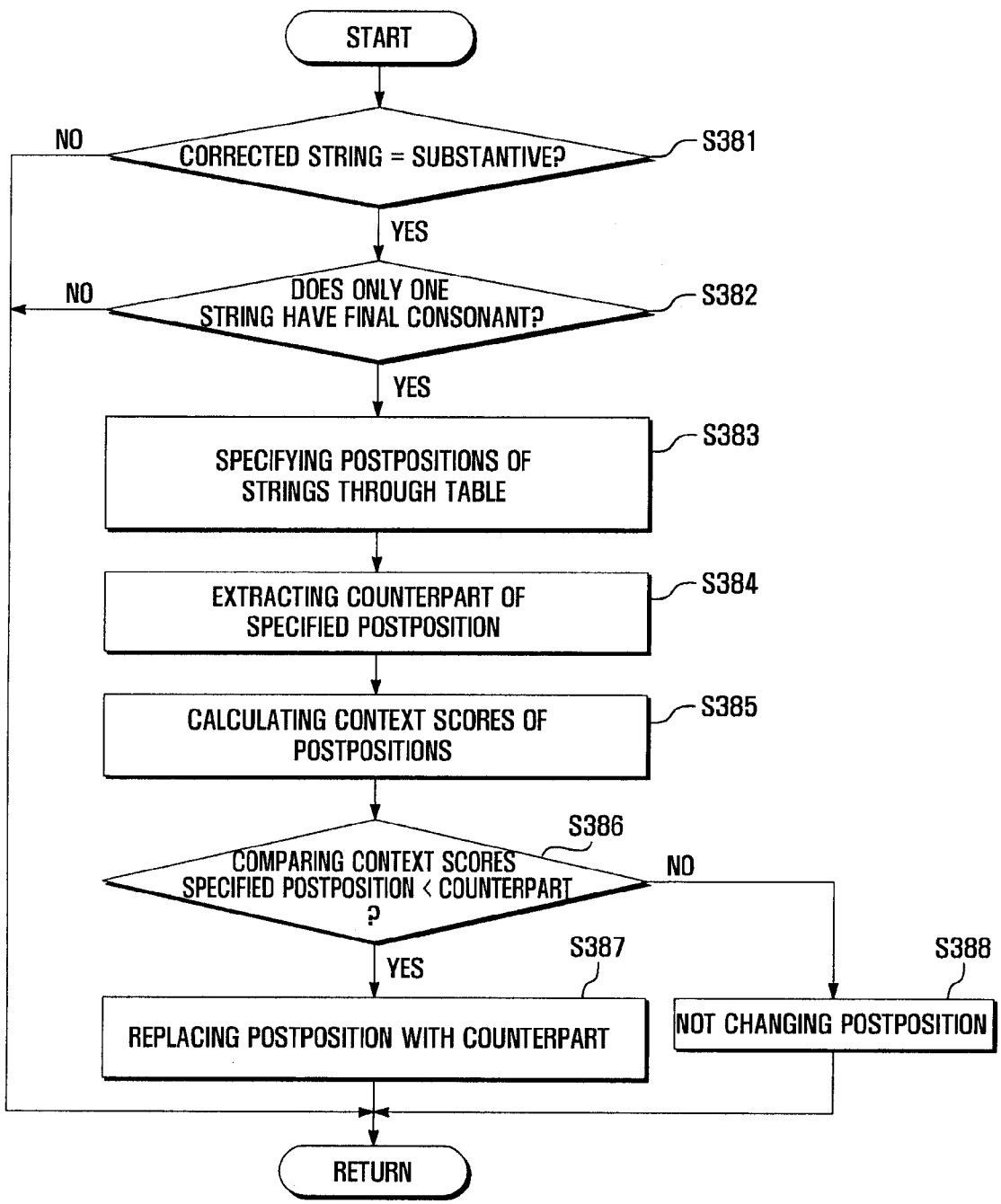
FIG. 9 is a flow diagram illustrating a postposition correcting process in a spelling correction method for misspelled inputs in accordance with another exemplary embodiment of the present invention.

FIG. 9 is a flow diagram illustrating exemplary operation of a postposition correcting process in a spelling correction method for misspelled inputs in accordance with an exemplary embodiment of the present invention.

Referring now to FIGS. 1 and 9, the postposition correction unit 144 determines whether a corrected string is a substantive (S381). In connection with three target strings (i.e., '남친', '시로' and '헨판') in the above-discussed example, corrected strings '남자친구' and '핸드폰' corresponding to '남친' and '헨판' are substantives, but the other string '시로' is not a substantive.

If a corrected string is a substantive, the postposition correction unit 144 further determines whether there is a final consonant in each last syllable of a target string and a corrected string (S382). For example, the last syllable of a target string '남친' is '친', and the last syllable of a corrected string '남자친구' is '구'. Therefore, the last syllable of a target string has a final consonant 'ㄴ', whereas the last syllable of a corrected string has no final consonant.

If both a target string and a corrected string have a final consonant in the last syllable, or if none of both strings has a final consonant in the last syllable, a correction of a postposition is not required. For example, all a target string '헨판' and a corrected string '핸드폰' have a final consonant 'ㄴ' in the last syllable. However, if only one of both strings has a final consonant, a postposition should be corrected. That is, step S382 is to determine whether only one of both strings has a final consonant in the last syllable.

If only one string has a final consonant, the postposition correction unit 144 goes to step S383 and ascertains postpositions each of which follows a target string or a corrected string. For example, let's suppose a sentence '남친이순신이다' (which has an ambiguous meaning and sounds 'nam-chi-ni-sun-si-ni-da') is given. This sentence may mean '남친 이순신이다' (which means 'is a boy friend Lee Sun-sin' and sounds 'nam-chin i-sun-si-ni-da') or '남친이 순신이다' (which means 'a boy friend is Sun-sin' and sounds 'nam-chi-ni sun-si-ni-da'). Due to an ambiguous meaning, a postposition is uncertain as well.

Therefore, the postposition correction unit 144 ascertains an exact postposition by using the postposition connection table 136 as shown in FIG. 5. Specifically, the postposition correction unit 144 compares letters following a string with all the postpositions registered in the postposition connection table 136. Through comparison, the postposition correction unit 144 specifies an exact postposition.

In the above example '남친이순신이다', two-syllable letters '이순' are not found in the postposition connection table 136, but one-syllable letter '이' is found. So, in step S383, the postposition correction unit 144 specifies a letter '이' as a postposition.

Next, the postposition correction unit 144 extracts the counterpart of a specified postposition from the postposition connection table 136 (S384). In the above example, the postposition correction unit 144 extracts a letter '가' as the counterpart of a specified postposition '이'.

Next, the postposition correction unit 144 calculates the context scores of both postpositions (S385). This calculation is executed in the same manner as the above-discussed calculation for the context score of a string. That is, necessary context information is substituted in Equation 2, and thus a context score is outputted.

Next, the postposition correction unit 144 compares the context scores of both postpositions with each other (S386). If the context score of a specified original postposition is greater than that of the counterpart, the postposition correction unit 144 goes to step S388 and does not change a specified original postposition. In the above example, a sentence results in '남자친구이 순신이다' (A boy friend is i-sun-sin.)

On the other hand, if the context score of a specified original postposition is smaller than that of the counterpart, the postposition correction unit 144 goes to step S387 and replaces an original postposition with the counterpart. In the above example, a sentence results in '남자친구 가순신이다' (A boy friend is sun-sin.)

Returning to FIGS. 1 and 8, after a postposition correcting process is completed as discussed heretofore, the string correction unit 142 determines whether to completely check all strings included in a user's input sentence M4 (S39). If there remains a string not yet checked, the string correction unit 142 returns to the aforesaid step S32 and executes steps S32 to S39 again to check an unchecked string.

If all strings in a user's input sentence M4 are completely checked, the applying unit 140 outputs a corrected user's input sentence M4 through the output unit 160 (S40). Therefore, a user can see a corrected sentence from which misspelled inputs are automatically removed.

As discussed in detail herein above, the present invention has advantages of requiring a smaller memory capacity due to a simpler calculation and of realizing a stronger spelling correction effect over conventional approaches requiring higher computing power. Accordingly, the present invention permits mobile devices having lower computing power in comparison with conventional approaches suitable for personal computers with greater computing power. Additionally, the present invention may lay the groundwork for development of natural language interface suitable for mobile devices.

Although the above-described exemplary embodiment is focused on the Korean language, the spelling correction system and method of the present invention does not rely on specific languages because of using a string-based matching technique. By replacing the above-described Korean language strings with other kind of language strings, the present invention can be easily applied to any other languages without a heavy burden.

In case of other kinds of languages such as English, a misspelling correction dictionary can be constructed in the same manner as discussed above and shown in FIG. 2. Additionally, an alphabet-based TRIE structure makes it possible to construct a misspelling correction dictionary which is independent of a kind of a language.

Furthermore, since a category of a string is generally dependent on a kind of a language, it is preferable that a category table as shown in FIG. 3 includes a category of closed parts-of-speech (e.g., an article and a preposition in case of English) according to a characteristic of a specific language.

Moreover, context information in case of some kinds of languages such as English may be obtained on the basis of alphabets instead of syllables. For example, context information $f(w_{-1}, W_{all})$ means a frequency that an alphabet $w_{-1}$ is found just before a string $W_{all}$.

Also, the replacement of postpositions and related processes are generally required for agglutinative languages such as Korean, Japanese and Turkish, but not required for inflected languages such as English.

On the other hand, the present invention is not limited to mobile devices, only and is also available for use other types of electronic devices, particularly those device that permit word input.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A spelling correction method for an electronic device comprising:
   (a) selecting context-sensitive strings, which have different meanings according to context, from among all strings registered in a misspelling correction dictionary stored in a memory on a basis of a corpus of accepted words;
   (b) acquiring context information about the context-sensitive strings;
   (c) receiving a user's input sentence by the electronic device;
   (d) selecting at least one target string from among all strings in the user's input sentence through the misspelling correction dictionary; and
   (e) correcting, when the target string is one of the context-sensitive strings, the target string by using the context information;
   wherein the context information includes a frequency that the target string is found in relation to one or more predefined categories of one or more adjacent syllables.

2. The method of claim 1, further comprising:
   after the correcting of the target string in (e), correcting a postposition in connection with the corrected target string.

3. The method of claim 2, the correcting of a postposition includes determining whether the corrected target string is a substantive, further determining whether there is a final consonant in each last syllable of the target string and the corrected target string, and replacing the postposition with the counterpart when only one of the target string and the corrected target string has a final consonant.

4. The method of claim 3, wherein the replacing of the postposition includes specifying the postposition following the corrected target string, extracting the counterpart of the specified postposition, calculating the respective context scores of the specified postposition and the counterpart, and comparing the calculated context scores with each other.

5. The method of claim 1, wherein the corpus of accepted words includes existing lexicons, vocabularies and dictionaries.

6. The method of claim 1, wherein the misspelling correction dictionary includes an incorrect string field used for recording incorrect strings, a correct string field used for recording correct strings from which spelling errors are removed, and a part-of-speech field used for recording parts of speech in connection with the incorrect strings or the correct strings.

7. The method of claim 6, wherein the selecting of the context-sensitive strings includes selecting the incorrect strings from the misspelling correction dictionary, and assigning the selected incorrect strings to the context-sensitive strings when the selected incorrect strings are found once or more in a corpus of learning words.

8. The method of claim 1, wherein the misspelling correction dictionary is stored in the memory after being converted into a syllable tree data (TRIE) structure or an alphabet TRIE structure.

9. The method of claim 1, wherein the acquiring of the context information about the context-sensitive strings includes obtaining the frequency the context-sensitive strings are found in a corpus of learning words.

10. The method of claim 9, wherein the acquiring of the context information about the context-sensitive strings further includes obtaining context information about strings corresponding to the context-sensitive strings.

11. The method of claim 1, wherein the context information includes a frequency $f(W_{before})$ a string $W_{before}$ is found in the corpus of learning words, a frequency $f(w_{-1},W_{all},w_{+1})$ a string $w_{-1}W_{all}w_{+1}$ is found, a frequency $f(w_{-1},W_{all})$ a string $w_{-1}W_{all}$ is found, a frequency $f(W_{all},w_{+1})$ a string $W_{all}w_{+1}$ is found, a frequency $f(c_{-1}, W_{all},c_{+1})$ a string $W_{all}$ is found between categories $c_{-1}$ and $c_{+1}$, a frequency $f(c_{-1},W_{all})$ a string $W_{all}$ is found after a category $c_{-1}$, and a frequency $f(W_{all},c_{+1})$ a string $W_{all}$ is found before a category $c_{+1}$, where a string $W_{all}$ includes the string $W_{before}$ before corrected and a string $W_{after}$ after corrected, where characters $w_{-1}$ and $w_{+1}$ mean respectively a syllable located just before the string $W_{all}$ and a syllable located just after the string $W_{all}$, and where characters $c_{-1}$ and $c_{+1}$ mean respectively categories to which the syllables $w_{-1}$ and $w_{+1}$ belongs.

12. The method of claim 11, wherein the correcting of the target string includes calculating a context score of the target string by using the context information about the target string, and replacing the target string with a string having a highest context score.

13. The method of claim 12, wherein the context score is calculated through a following Equation:

$$P(W_{before} \mid w_{-1}, W_{all}, w_{+1}) \approx \alpha \frac{f(W_{before})}{f(w_{-1}, W_{all}, w_{+1})} + \beta \frac{f(W_{before})}{f(w_{-1}, W_{all}) + f(W_{all}, w_{+1})} + \gamma \frac{f(W_{before})}{f(c_{-1}, W_{all}, c_{+1})} + \delta \frac{f(W_{before})}{f(c_{-1}, W_{all}) + f(W_{all}, c_{+1})}$$

wherein $P(W_{before} \mid w_{-1}, W_{all}, w_{+1})$ is the context score and $\alpha, \beta, \gamma$ and $\delta$ are weight parameters.

14. The method of claim 1, wherein the one or more predefined categories are selected from a kind of language, a number, a special character, an auxiliary inflectional word, a suffix, a postposition, and a verb ending.

15. A spelling correction system of an electronic device comprising:
a dictionary constructing unit for constructing a misspelling correction dictionary on a basis of a corpus of accepted words;
an information extracting unit for selecting context-sensitive strings, which have different meanings according to context, from among all strings registered in the misspelling correction dictionary, and for acquiring context information about the selected context-sensitive strings;
an input unit receiving a user's input sentence; and
a string correction unit for selecting at least one target string from among all strings in the user's input sentence through the misspelling correction dictionary, and, when the target string is one of the context-sensitive strings, correcting the target string by using the context information,
wherein the context information includes a frequency that the target string is found in relation to one or more predefined categories of one or more adjacent syllables.

16. The system of claim 15, further comprising:
a postposition correction unit for correcting a postposition in connection with the corrected target string.

17. The system of claim 16, wherein the dictionary constructing unit converts the misspelling correction dictionary into a syllable tree data (TRIE) structure or an alphabet TRIE structure.

18. The system of claim 16, wherein the postposition correction unit determines whether the corrected target string is a substantive, further determines whether there is a final consonant in each last syllable of the target string and the corrected target string, and replaces the postposition with the counterpart when only one of the target string and the corrected target string has a final consonant.

19. The system of claim 16, further comprising:
a memory unit in the electronic device for storing the misspelling correction dictionary and the context information.

20. The system of claim 15, wherein the misspelling correction dictionary further includes an incorrect string field means for recording incorrect strings, a correct string field means for recording correct strings from which spelling errors are removed, and a part-of-speech field means for recording parts of speech in connection with the recorded incorrect strings or the correct strings.

21. The system of claim 15, wherein the information extracting unit selects the incorrect strings from the misspelling correction dictionary, and assigns the selected incorrect strings to the context-sensitive strings when the selected incorrect strings are found once or more in a corpus of learning words.

22. The system of claim 15, wherein the information extracting unit further acquires context information about strings corresponding to the context-sensitive strings.

23. The system of claim 15, wherein the string correction unit calculates a context score of the target string by using the context information about the target string, and replaces the target string with a string having a highest context score.

24. The system of claim 23, wherein the context information includes a frequency $f(W_{before})$ a string $W_{before}$ is found in a corpus of learning words, a frequency $f(w_{-1},W_{all},w_{+1})$ a string $w_{-1}W_{all}w_{+1}$ is found, a frequency $f(w_{-1},W_{all})$ a string $w_{-1}W_{all}$ is found, a frequency $f(W_{all},w_{+1})$ a string $W_{all}w_{+1}$ is found, a frequency $f(c_{-1},W_{all},c_{+1})$ a string $W_{all}$ is found between categories $c_{-1}$ and $c_{+1}$, a frequency $f(c_{-1},W_{all})$ a string $W_{all}$ is found after a category $c_{-1}$, and a frequency $f(W_{all},c_{+1})$ a string $W_{all}$ is found before a category $c_{+1}$, where a string $W_{all}$ includes the string $W_{before}$ before corrected and a string $W_{after}$ after corrected, where characters $w_{-1}$ and $w_{+1}$ mean respectively a syllable located just before the string $W_{all}$ and a syllable located just after the string $W_{all}$, and where characters $c_{-1}$ and $c_{+1}$ mean respectively categories to which the syllables $w_{-1}$ and $w_{+1}$ belongs.

25. The system of claim 24, wherein the string correction unit calculates the context score through an Equation as follows:

$$P(W_{before} \mid w_{-1}, W_{all}, w_{+1}) \approx \alpha \frac{f(W_{before})}{f(w_{-1}, W_{all}, w_{+1})} + \beta \frac{f(W_{before})}{f(w_{-1}, W_{all}) + f(W_{all}, w_{+1})} + \gamma \frac{f(W_{before})}{f(c_{-1}, W_{all}, c_{+1})} + \delta \frac{f(W_{before})}{f(c_{-1}, W_{all}) + f(W_{all}, c_{+1})},$$

wherein $P(W_{before} \mid w_{-1}, W_{all}, w_{+1})$ is the context score and $\alpha, \beta, \gamma$ and $\delta$ are weight parameters.

* * * * *